Dec. 2, 1924.  
P. O. TRAHAN  
1,517,323  
SAFETY ATTACHMENT FOR TRACTORS  
Filed Sept. 6, 1922     2 Sheets-Sheet 1
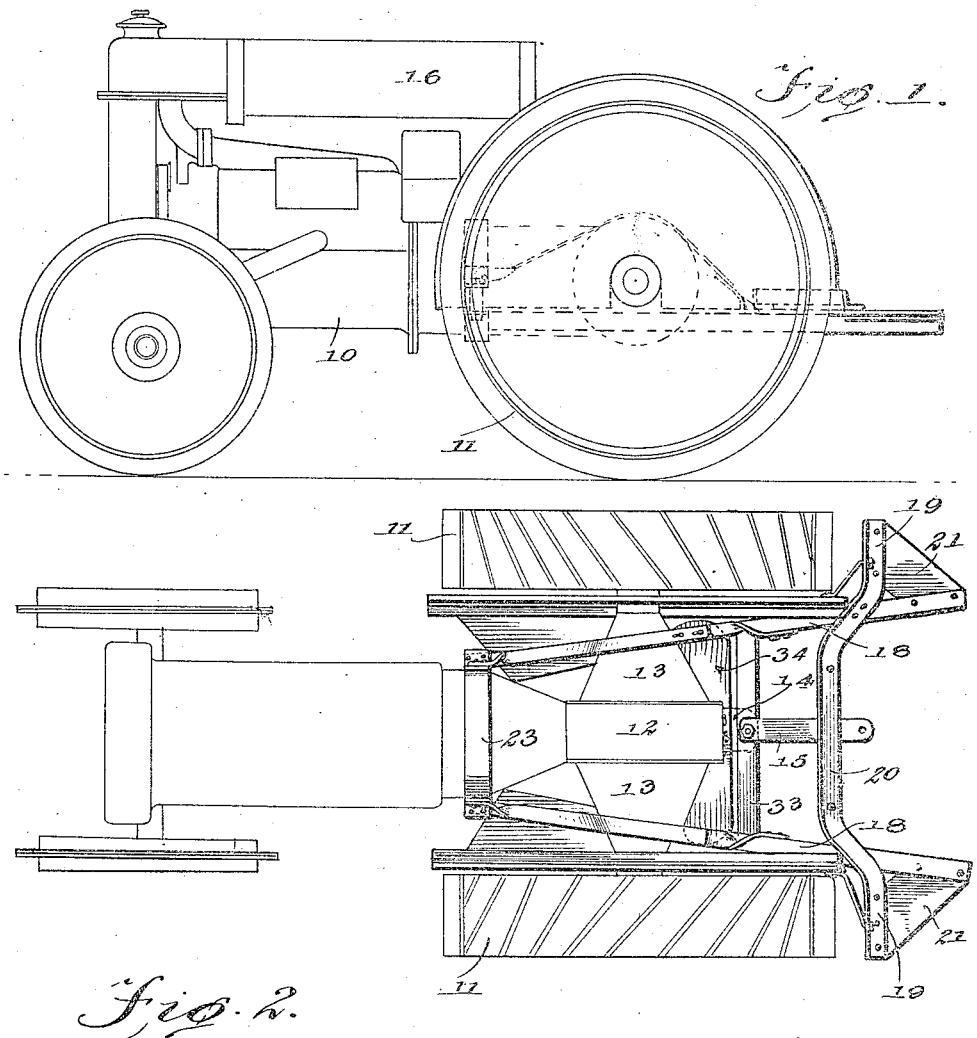
WITNESSES
INVENTOR  
Paul O. Trahan,  
BY  
ATTORNEYS

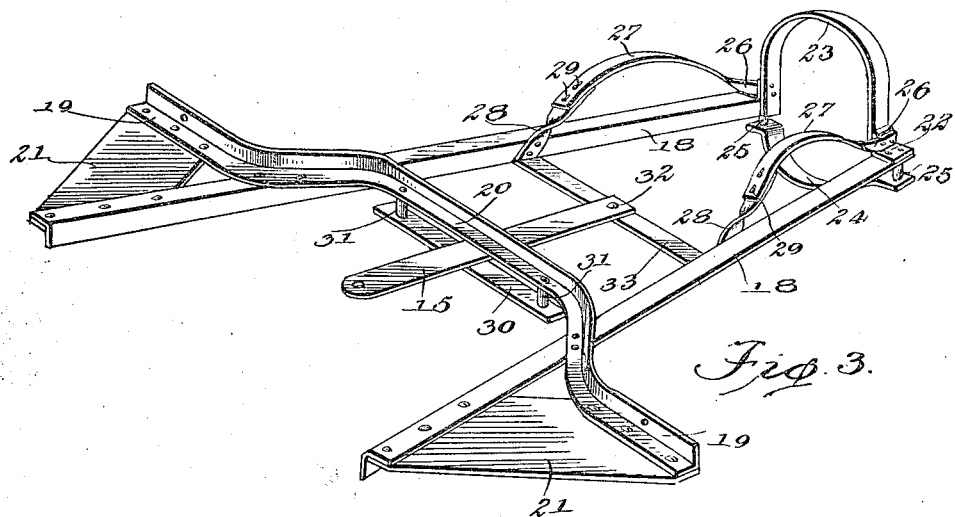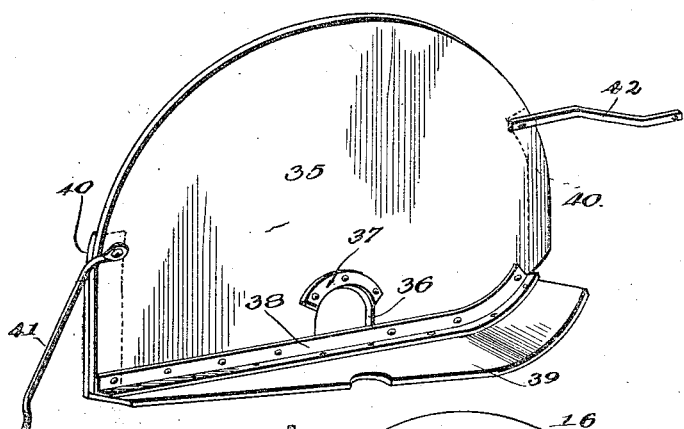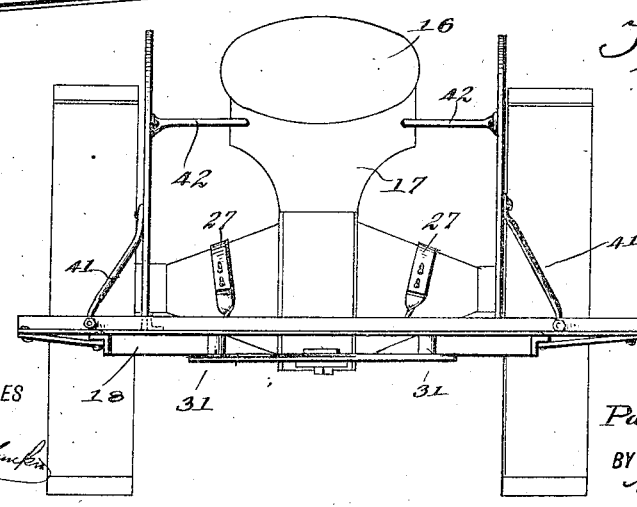

Patented Dec. 2, 1924.

1,517,323

UNITED STATES PATENT OFFICE.

PAUL O. TRAHAN, OF GUEYDAN, LOUISIANA.

SAFETY ATTACHMENT FOR TRACTORS.

Application filed September 6, 1922. Serial No. 586,469.

*To all whom it may concern:*

Be it known that I, PAUL O. TRAHAN, a citizen of the United States, and a resident of Gueydan, in the parish of Vermilion and State of Louisiana, have invented certain new and useful Improvements in Safety Attachments for Tractors, of which the following is a specification.

My present invention relates generally to tractors of a certain well known type and more particularly to safety attachments therefor of the general character described and claimed in my Patent 1,409,043, dated March 7, 1922, upon the construction of which my present invention aims to provide certain refinements and additions in the interests of rigidity, strength, durability and general effectiveness.

In the accompanying drawings which illustrate my present invention and form a part of this specification, Figures 1 and 2 are respectively a side and top plan view illustrating the practical application of my invention, Figure 3 is a perspective view of the frame of the safety apparatus, Figure 4 is a similar view of the side shields, and Figure 5 is a rear elevation illustrating the practical application of the invention.

Referring now to these figures and particularly to Figures 1, 2 and 5 I have shown certain parts of a tractor of well known type in which the transmission housing appears at 10, the rear traction wheels at 11, the differential casing at 12 between the side sections 13 of the rear axle housing, provided with a central rearwardly projecting lug 14 of the draw bar 15, and in which the fuel tank appears at 16, and has as usual a rear support indicated generally at 17 in Figure 5.

My present safety device like that shown in my former patent includes a frame consisting of forwardly diverging side bars 18 whose rear ends project substantially beyond the rear portions of the traction wheels 11 and serve, in conjunction with the outwardly projecting end portions 19 of a cross bar 20, to support triangular plates 21 which are bolted to the rearmost portions of the side bars and to the outer ends 19 of the cross bar so as to constitute steps by the use of which mounting of the safety frame when the latter is in place is greatly facilitated. It will be understood that these steps also at the same time extending as they do across the traction wheels rearwardly beyond the latter, form safety devices which prevent rearward overturning of the tractor.

In the present instance the forward ends of the side bars 18, as most plainly seen in Figure 3, are connected by angle pieces 22 to the lower side portions of the upper inverted U-shaped section 23 of the transmission housing encircling strap whose lower curved section 24 is adjustably connected at its ends by bolts 25 to the forward ends of the side bars and to the angle pieces 22, the upright portions of the latter of which also serve to receive the rigidly connected forward twisted ends 26 of a pair of truss straps 27 extending generally along the side bars 18 and provided with rear twisted ends 28 secured to the said side bars. These truss straps extend over the side portions 13 of the rear axle housing, beneath which the side bars 18 are mounted, and are preferably formed in two parts having inner overlapping and adjustably connected ends plainly indicated at 29 in Figure 3.

It will be particularly noted from Figures 2 and 3 that the central portion of the cross bar 20 is forwardly offset between its ends 19 and that, between the side bars 18, this cross bar in the present instance supports a lower guide strip 30 paralleling the same and secured thereto in spaced relation by spacing bolts 31 so as to form a guide space between the same and the central portion of the cross bar rearwardly through which the draw bar 15 extends.

The forward end of the draw bar is connected to the lug 14 of the differential housing 12 by a bolt 32 which also passes centrally through a frame bracing cross strap 33, the latter extending across the space between the side bars 18 and connected at its ends to the latter substantially at the points of connection of the rear ends of the truss bars 27.

It is obvious that a platform of any suitable character may be utilized and disposed upon the side bars 18 forwardly of the cross bar 20 and above the cross brace 33, such a platform being common in devices of this nature and being omitted in the present illustration in order to avoid obscuring the remaining parts. Where a platform is utilized, it is preferably employed in connection with a platform shield seen at 34 in Figure 2 and preferably comprising two sections whose inner ends are adjustably connected in overlapping relation and whose outer ends are preferably secured to the side bars 18 forwardly of the cross brace 33.

I also propose upright side shields 35 disposed in spaced relation to the inner surfaces of the traction wheels 11, each shield 35 having a lower opening 36 to receive one of the side portions of the rear axle housing and provided with a curved reinforcing strip 37 around the upper portion of the opening so as to reinforce that portion of the shield which rests upon the axle housing. Along its lower edge, each shield 35 is connected, preferably by an angle bar 38 with a horizontal side shield 39 which follows along one of the side bars 18 and covers the space between this bar and the adjacent traction wheel. The lower portions of the forward and rear edges of each upright shield 35 are preferably provided with bracing strips indicated at 40, and to these portions of each upright shield are secured brackets 41 and 42, each rear bracket 41 extending outwardly and downwardly from the rear portion of the shield and connected to one outer end 19 of the cross bar 20. Each forward bracket 42 extends from the forward portion of the respective shield and is secured to some suitable portion of the tractor as for instance the rear support 17 of the fuel tank 16.

In view of the above details I am enabled to utilize the safety device in a practical efficient manner, readily assemble or disassemble the same, and promote strength, rigidity and durability.

I claim:

1. The combination with a tractor having rear traction wheels, a transmission case, rear axle housings and a differential case between the rear axle housings having a rearwardly projecting lug to which a draw bar is attached, of a frame including side bars converging in a forward direction beneath the rear axle housings, having means at their forward ends in clamping engagement with the transmission case and having means at their rear ends forming steps rearwardly of the traction wheels, and a cross brace between and rigidly connecting said side bars intermediate their ends, said cross brace being secured to the lug of the differential casing in connection with said draw bar and a cross frame member having means forming a draw bar guide.

2. The combination with a tractor having rear traction wheels, a transmission case, rear axle housings and a differential case between the rear axle housings having a rearwardly projecting lug to which a draw bar is attached, of a frame including side bars converging in a forward direction beneath the rear axle housings, having means at their forward ends in clamping engagement with the transmission case and having means at their rear ends forming steps rearwardly of the traction wheels, connecting straps paralleling the forward portions of the side bars and extending over the rear axle housings, said straps being in adjustable sections and connected at their opposite ends to the side bars, a cross brace rigidly connecting said side bars intermediate their ends and secured in the said lug of the differential casing in connection with the said draw bar, and a rear cross bar also rigidly connecting the side bars adjacent to their rear ends and cooperating therewith in the support of said step forming means, said rear cross bar having a guide for the draw bar as described.

3. The combination with a tractor having rear traction wheels, a transmission case, rear axle housings and a differential case between the rear axle housings having a rearwardly projecting lug to which a draw bar is attached, of a frame including side bars converging in a forward direction beneath the rear axle housings, having means at their forward ends in clamping engagement with the transmission case and having means at their rear ends forming steps rearwardly of the traction wheels, a cross brace rigidly connecting said side bars intermediate their ends and secured in the said lug of the differential casing in connection with the said draw bar, and a rear cross bar also rigidly connecting the side bars adjacent to their rear ends and having rearwardly offset ends beyond the side bars, cooperating with the rear ends of the side bars in the support of said step forming means, said rear cross bar having a guide strip secured along and spaced below its intermediate portion, between the said side bars, forming between the same and the cross bar a guide space rearwardly through which the draw bar extends.

PAUL O. TRAHAN.